United States Patent
Schulte

[11] Patent Number: 5,863,165
[45] Date of Patent: Jan. 26, 1999

[54] SELF-TAPPING SCREW

[75] Inventor: Helmut Schulte, Lüdenscheid, Germany

[73] Assignee: fisherwerke Artur Fisher GmbH & Co. KG, Waldachtal, Germany

[21] Appl. No.: 936,377

[22] Filed: Sep. 24, 1997

[30] Foreign Application Priority Data

Sep. 24, 1996 [DE] Germany .................. 196 39 135 .0

[51] Int. Cl.$^6$ ...................... F16B 25/00; F16B 35/04
[52] U.S. Cl. ..................... 411/386; 411/418; 411/420
[58] Field of Search ...................... 411/310, 311, 411/386, 387, 418, 420, 421

[56] References Cited

U.S. PATENT DOCUMENTS

| | | | |
|---|---|---|---|
| 924,273 | 6/1909 | Rehse | 411/418 |
| 1,088,892 | 4/1914 | Foreman . | |
| 1,933,332 | 10/1933 | May | 411/418 |
| 2,200,227 | 5/1940 | Olson | 411/418 X |
| 3,176,746 | 4/1965 | Walton | 411/311 X |
| 3,390,410 | 7/1968 | Bridges | 411/418 X |
| 3,942,406 | 3/1976 | Egner | 411/386 |
| 4,973,209 | 11/1990 | Essom et al. | 411/386 |
| 5,044,853 | 9/1991 | Dicke | 411/311 |

FOREIGN PATENT DOCUMENTS

| | | |
|---|---|---|
| 18 89 644 | 3/1964 | Germany . |
| 1 996 316 | 11/1968 | Germany . |
| 91 08 879.8 | 11/1991 | Germany . |

*Primary Examiner*—Neil Wilson
*Attorney, Agent, or Firm*—Michael J. Striker

[57] ABSTRACT

A self-tapping screw has a thread shaft having a leading end, a wood screw thread provided on the thread shaft and having a plurality of turns, and milling profiles formed on the turns of the wood screw thread and spaced from one another in an axial direction, the milling profiles becoming smaller the further away the milling profiles are from the leading end, some thread turns at a head end of the thread shaft being free of milling profiles.

6 Claims, 2 Drawing Sheets

SELF-TAPPING SCREW

BACKGROUND OF THE INVENTION

The invention relates to a self-tapping screw. More particularly, the present invention relates to a self-tapping screw having a tip at the leading end of the thread shaft and a wood screw thread.

Such self-tapping screws are used as mounting screws for light loads for fastening to construction materials wooden laths, metal shaped pieces, perforated strips, battens, hanging wires and the like. Especially for reasons of the statistics, the pre-drilled hole in the construction material should have as small a diameter as possible. The cutting or milling of the female thread by the self-tapping screw is unsatisfactory because all the thread turns have a milling profile, with the result that each thread turn as far as the head end, as it engages, processes the counterthread afresh.

SUMMARY OF THE INVENTION

Accordingly, it is an object of present invention to provide a self-tapping screw which avoids the disadvantages of the prior art.

More particularly, it is an object of present invention to provide a self-tapping screw in which the hardened milling profiles is constructed so that a counterthread is produced that is as load-bearing as possible.

In keeping with these objects and with others which will become apparent hereinafter, one feature of present invention resides, briefly stated, in a self-tapping screw in which the thread is cut out to form a profile extending along an axial line, and the milling profiles become smaller the further away it is from the leading end, and some thread turns at the head end of the thread shaft are free of the profile.

When the self-tapping screw is designed in accordance with the present invention the head end of the wood screw thread is free of milling the profile and is able to receive a load over its entire circumference. The counterhead is therefore highly load-bearing.

An especially good milling action or cutting action is obtained by the fact that the profile is arranged as far as the leading end of the thread shaft and thus effects reliable thread formation.

Advantageous profiles are in the form of circle segments, rectangular projections, triangular projections or tooth-like projections.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
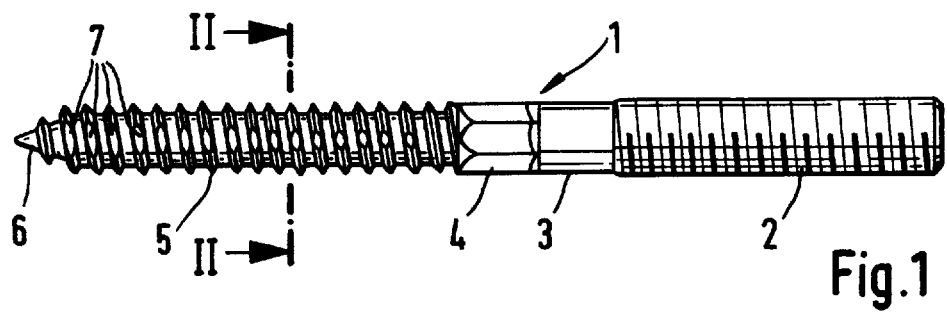
FIG. 1 is a view of a first embodiment of a self-tapping screw in accordance with the present invention.
Figure 2:
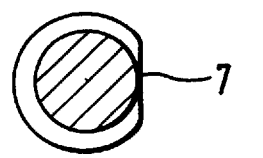
FIG. 2 is a section along line II—II in FIG. 1 of a self-tapping screw in accordance with the present invention.

FIGS. 1 and 2 show a mounting screw 1 in the form of a self-tapping screw. The shaft comprises, starting from the head end, a first thread 2, optionally a thread-free section 3, an actuating profile 4 and a wood screw thread 5. Instead of the actuating profile 4, there may be provided at the head an actuating profile in the shape of a hexagonal head, a socket profile or the like. The wood screw thread 5 terminates in a tip at the leading end of the thread shaft 1.

The thread turns of the screw thread 5 are cut out to form a milling profile 7 along an axial line that extends substantially along the entire length of the wood screw thread 5. In the embodiment shown in FIGS. 1 and 2 the milling profile 7 is formed by cutting out a circle segment from the thread turns of the wood screw thread 5. The milling profile 7 extend to the tip 6 of the leading end of the thread and becomes smaller the further away they are from the leading end. One or more thread turns at the head end of the thread shaft is/are free of milling profile. That ensures that the thread turns at the head end are load-bearing around their entire circumference. On screwing in the self-tapping screw, the milling profile, starting from the tip, engages immediately with the walls of the pre-drilled hole, with the result that good thread formation of the counterthread is obtained.

Figure 3:
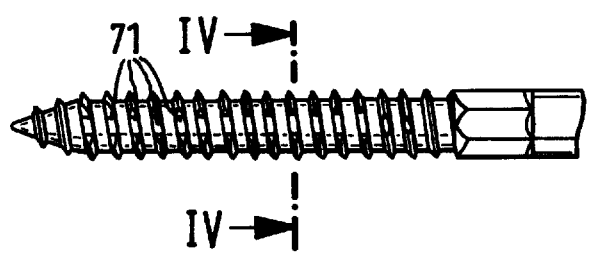
FIG. 3 is a view of a second embodiment of a self-tapping screw in accordance with the present invention.
Figure 4:
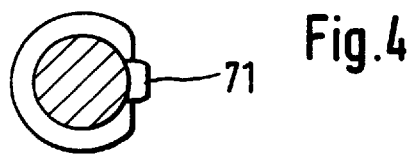
FIG. 4 is a section along line IV—IV in FIG. 3 of a self-tapping screw in accordance with the present invention.
Figure 5:
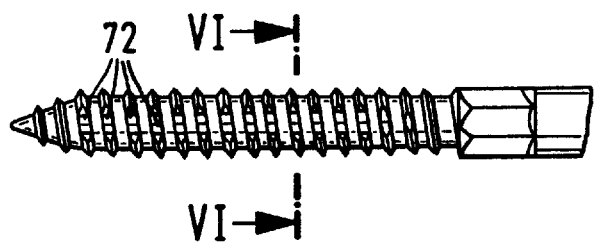
FIG. 5 is a view of a third embodiment of a self-tapping screw in accordance with the present invention.
Figure 6:
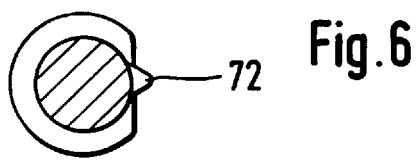
FIG. 6 is a section along line VI—VI in FIG. 5 of a self-tapping screw in accordance with the present invention.
Figure 7:
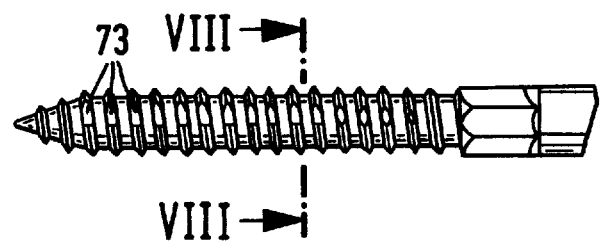
FIG. 7 is a view of a fourth embodiment of a self-tapping screw in accordance with the present invention.
Figure 8:
FIG. 8 is a section along line VIII—VIII in FIG. 7.

The milling profiles can have different forms. For example FIGS. 3 and 4 show milling profiles 71 in the form of rectangular projections. FIGS. 5 and 6 show milling profiles 72 in the form of triangular projections. FIGS. 7 and 8 show milling profiles 73 in the form of tooth-like projections, each having a tooth-like edge as cutting edge.

It will be understood that each of the elements described above, or two or more together, may also find a useful application in other types of constructions differing from the types described above.

While the invention has been illustrated and described as embodied in self-tapping screw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-tapping screw, comprising a threaded shaft having a leading end; and a wood screw thread provided on said threaded shaft and having a plurality of turns, said turns of said wood screw thread being partially cut out so as to form a profile, said profile becoming smaller the further away the profile is from said leading end, some thread turns at a head end of said threaded shaft being free of said profile, said profile being formed as a rectangular projection.

2. A self-tapping screw as defined in claim 1, wherein said profile extends to said leading end of said threaded shaft.

3. A self-tapping screw, comprising a threaded shaft having a leading end; and a wood screw thread provided on said threaded shaft and having a plurality of turns, said turns of said wood screw thread being partially cut out so as to form a profile, said profile becoming smaller the further away the profile is from said leading end, some thread turns at a head end of said threaded shaft being free of said profile, said profile being formed as a triangular projection.

4. A self-tapping screw as defined in claim 3, wherein said profile extends to said leading end of said threaded shaft.

5. A self-tapping screw, comprising a threaded shaft having a leading end; and a wood screw thread provided on said threaded shaft and having a plurality of turns, said turns of said wood screw thread being partially cut out so as to form a profile, said profile becoming smaller the further away the profile is from said leading end, some thread turns at a head end of said threaded shaft being free of said profile, said profile being formed as a toothed-like projection.

6. A self-tapping screw as defined in claim 5, wherein said profile extends to said leading end of said threaded shaft.

* * * * *